(12) United States Patent
Lee

(10) Patent No.: US 8,178,469 B1
(45) Date of Patent: May 15, 2012

(54) HIGHLY EFFICIENT CATALYST USING PRECIOUS METAL

(75) Inventor: Hyokyung Lee, Yongin (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 13/188,880

(22) Filed: Jul. 22, 2011

(30) Foreign Application Priority Data

Nov. 30, 2010 (KR) .................. 10-2010-0120937

(51) Int. Cl.
*B01J 23/00* (2006.01)
*B01J 21/00* (2006.01)
*B01J 20/00* (2006.01)
*B01J 29/00* (2006.01)
*B01J 37/00* (2006.01)

(52) U.S. Cl. ........ 502/327; 502/261; 502/263; 502/332; 502/333; 502/334; 502/339; 502/355; 502/415; 502/439; 502/527.18; 502/527.19

(58) Field of Classification Search .......... 502/261, 502/263, 327, 332, 333, 334, 339, 355, 415, 502/439, 527.18, 527.19; 422/170–180
See application file for complete search history.

(56) References Cited

U.S. PATENT DOCUMENTS

| | | | | |
|---|---|---|---|---|
| 4,405,507 A * | 9/1983 | Carr et al. | ...................... | 502/327 |
| 4,440,874 A * | 4/1984 | Thompson | ..................... | 502/327 |
| 4,509,966 A * | 4/1985 | Dimick et al. | .................. | 55/502 |
| 4,524,051 A * | 6/1985 | Wright et al. | ............... | 423/437.2 |
| 5,750,458 A * | 5/1998 | Kennelly et al. | ............... | 502/304 |
| 5,789,336 A * | 8/1998 | Pazzucconi et al. | .......... | 502/240 |
| 6,106,802 A * | 8/2000 | Lujano et al. | .................. | 423/702 |
| 6,958,309 B2 * | 10/2005 | Wang et al. | .................... | 502/325 |
| 7,060,651 B2 * | 6/2006 | Barelko et al. | ................ | 502/240 |
| 7,323,432 B2 * | 1/2008 | Niihara et al. | ................ | 502/300 |
| 7,772,151 B2 * | 8/2010 | Li et al. | ......................... | 502/339 |
| 7,935,653 B2 * | 5/2011 | Shimazu et al. | .............. | 502/302 |
| 7,985,708 B2 * | 7/2011 | Bowe et al. | .................... | 502/300 |
| 2002/0150518 A1 * | 10/2002 | Brush et al. | .................... | 422/180 |
| 2005/0249645 A1 * | 11/2005 | Kaboord et al. | .............. | 422/177 |
| 2008/0167178 A1 | 7/2008 | Malyala et al. | | |
| 2010/0166633 A1 | 7/2010 | Wu et al. | | |

FOREIGN PATENT DOCUMENTS

| | | | |
|---|---|---|---|
| GB | 2468210 A | 9/2010 |
| JP | 07-308585 A | 11/1995 |
| JP | 3389851 B2 | 10/1998 |
| JP | 2003-001114 A | 1/2003 |
| JP | 2007-196212 A | 8/2007 |
| JP | 2007-530277 A | 11/2007 |
| JP | 2008-114227 A | 5/2008 |
| KR | 10-2006-0135754 A | 12/2006 |
| WO | WO 99/30816 A1 | 6/1999 |

* cited by examiner

*Primary Examiner* — Cam N. Nguyen
(74) *Attorney, Agent, or Firm* — Morgan, Lewis & Bockius LLP

(57) ABSTRACT

A catalyst for purifying exhaust gas in vehicles may include a precious metal and porous structures that serve as a supporting material for the precious metal. The porous structures are comprised of a plurality of channels which are connected with each other by a plurality of bridges. The channels may have multiple entrances that allow reactants to pass through and react with the precious metal.

7 Claims, 4 Drawing Sheets

HIGHLY EFFICIENT CATALYST USING PRECIOUS METAL

CROSS-REFERENCE TO RELATED APPLICATION

The present application claims priority of Korean Patent Application Number 10-2010-0120937 filed in the Korean Intellectual Property Office on Nov. 30, 2010, the entire contents of which application is incorporated herein for all purposes by this reference.

BACKGROUND OF THE INVENTION

1. Field of the Invention

The present invention relates to a catalyst using a precious metal. More particularly, the present invention relates to a highly efficient catalyst using a three-dimensional porous structure as a supporting material for the precious metal in order to prevent an inaccessible region of the precious metal from being generated, and further improve the diffusion of exhaust gas.

2. Description of Related Art

Recently, according to the increasing usage of vehicles and severe traffic, air pollution by exhaust gas is becoming an issue. In order to regulate exhaust gas and enforce the regulations, many countries have established emission standards for pollution substances such as carbon monoxide (CO), hydrocarbon (HC), and nitrogen oxide (NOx) in exhaust gas.

Usually, catalysts coated with precious metals such as platinum (Pt), palladium (Pd), and rhodium (Rh) are used for removing noxious substances from the exhaust gas of vehicles. These catalysts remove the noxious substances from the exhaust gas and purify the exhaust gas by promoting decomposition of the hydrocarbons, oxidization of the carbon monoxide, and reduction of the nitrogen oxide.

A catalyst uniformly coated with a precious metal in a supporting material as a purifying catalyst of exhaust gas has been published. In a case of a conventional catalyst for purifying vehicle exhaust gas, the catalyst is manufactured by coating catalytic substances including the expensive precious metal on a supporting material shaped as a honeycomb in order to increase the contact area between the catalyst and the exhaust gas, and thus to increase the reaction area.

Typically, square cells are used as the unit cells of the honeycomb supporting material. However, as shown in FIG. 1, using square cells in a catalyst creates corners where certain amount of catalytic substances accumulates resulting in a thicker catalytic layer 14 in the vicinity of the corners.

Noxious reactants 16 such as CO, HC, and NOx in the exhaust gas diffuse into the catalytic layer and are then converted into harmless substances in contact with the precious metal (Pt, Pd, and Rh). The arrow in FIG. 1 shows the diffusion of the exhaust gas around a corner. Because the catalytic layer there is thicker, the exhaust gas cannot diffuse into the region 15 of the precious metal. As such, the catalyst in deep corners becomes an inaccessible region, that is, a dead zone into which the CO, HC, and NOx cannot diffuse. So the precious metal in the inaccessible region 15 cannot participate in reaction.

To solve the above problems, a hexagonal cell 20 in FIG. 2 was contrived. But the isotropic strength of the hexagonal cell 20 is weaker than that of the square cell 10, so few hexagonal cells 20 are actually used.

FIG. 3(A) shows a schematic view of a diffusion path of reactants in a unit cell where 12 refers to a cell wall and can be made of cordierite. FIG. 3(B) and FIG. 3(C) show schematic views of two catalysts where the one shown in FIG. 3(C) is deteriorate. In the past, an amorphous powder was used as a supporting body 50, so the density of the catalytic layer grew large, the diffusion of the exhaust gas was deteriorated thereby, and an inaccessible region of the precious metal 15 was generated. In addition, the reaction surface was reduced and pores were covered after the precious metal was sintered (referring to 40 and 50a) or after the precious metal was reacted with sulfur in exhaust gas and was poisoned or otherwise contaminated (referring to 55). Furthermore, inaccessible regions of precious metal 50b were generated.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention have been made in an effort to address the problems mentioned above and to provide a highly efficient catalyst by using porous structures as precious metal supporting materials to improve the diffusion of exhaust gas. Various aspects of the present invention provide catalysts to purify the exhaust gas from vehicles. The catalysts use a precious metal and a supporting material that includes the precious metal and has porous structures.

One aspect of the porous structures according to the present invention is characterized in that they have a plurality of channels and the channels are connected with other channels by bridges.

Another aspect of the porous structures according to the present invention is characterized in that the structures include channels through which reactant pass thereof.

Yet other aspects of the porous structures according to the present invention is characterized in that they are made of mesoporous nanoparticles such as MCM or SBA type materials. These mesoporous nanoparticles include mesoporous silica and mesoporous alumina.

Various aspects of the present invention provide several advantages. First, particles of precious metal can be uniformly spread so that the reaction surface can be increased. Secondly, even if one channel entrance of the structures is blocked by sintering of a supporting material poisoned or contaminated with sulfur, the exhaust gas can pass through other channel entrances so the catalyst can still be reachable and engaging in reaction.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
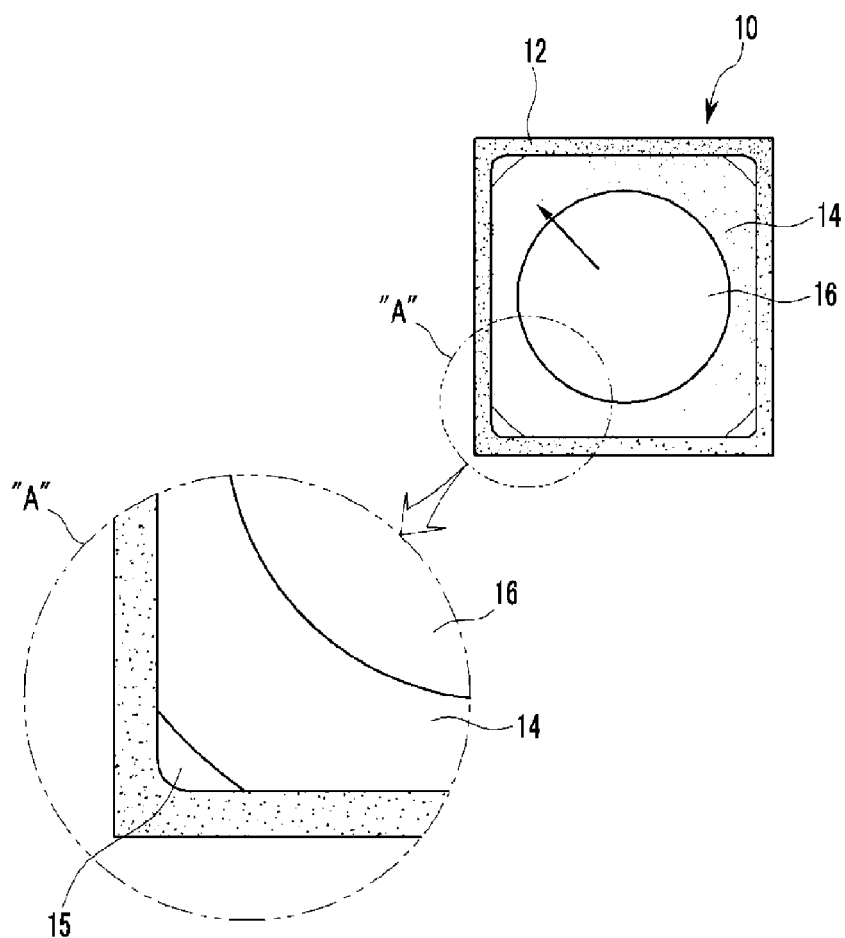
FIG. 1 is a schematic view of a unit cell including a conventional square supporting material.
Figure 2:
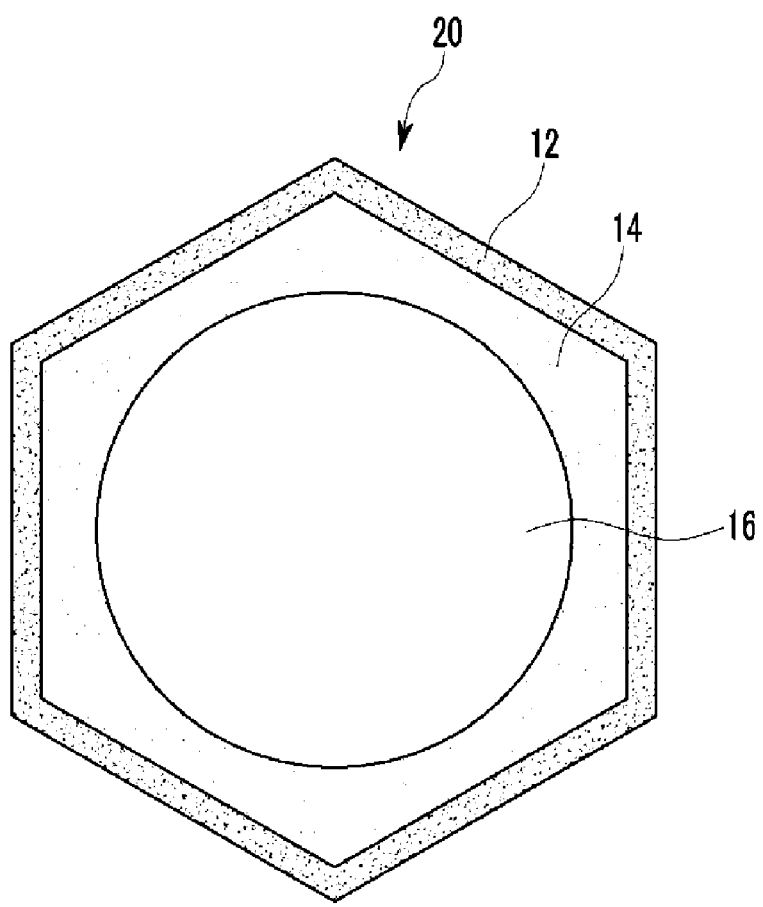
FIG. 2 is a schematic view of the unit cell including a conventional hexagonal supporting material.
Figure 3:
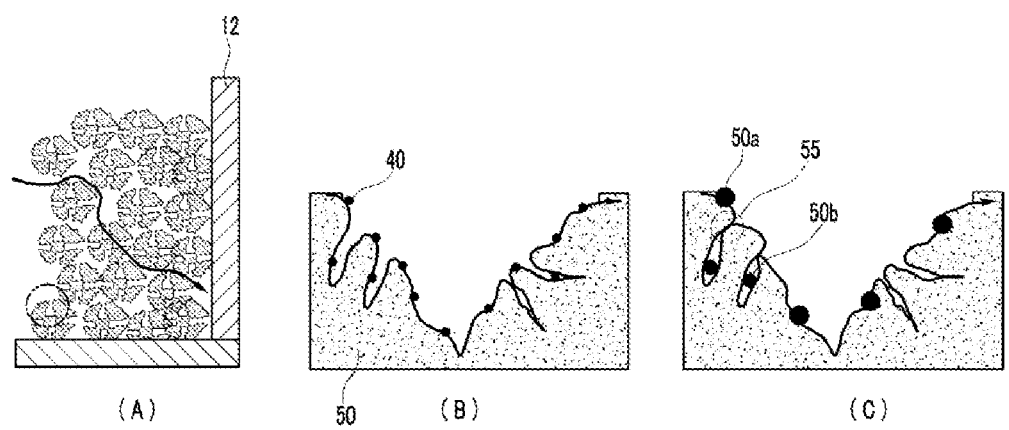
FIG. 3(A) shows a schematic view of the diffusion path of reactants in a unit cell where number 12 refers to a cell wall.
FIG. 3(B) is a schematic view of a catalyst.
FIG. 3(C) is a schematic view of another catalyst
Figure 4:
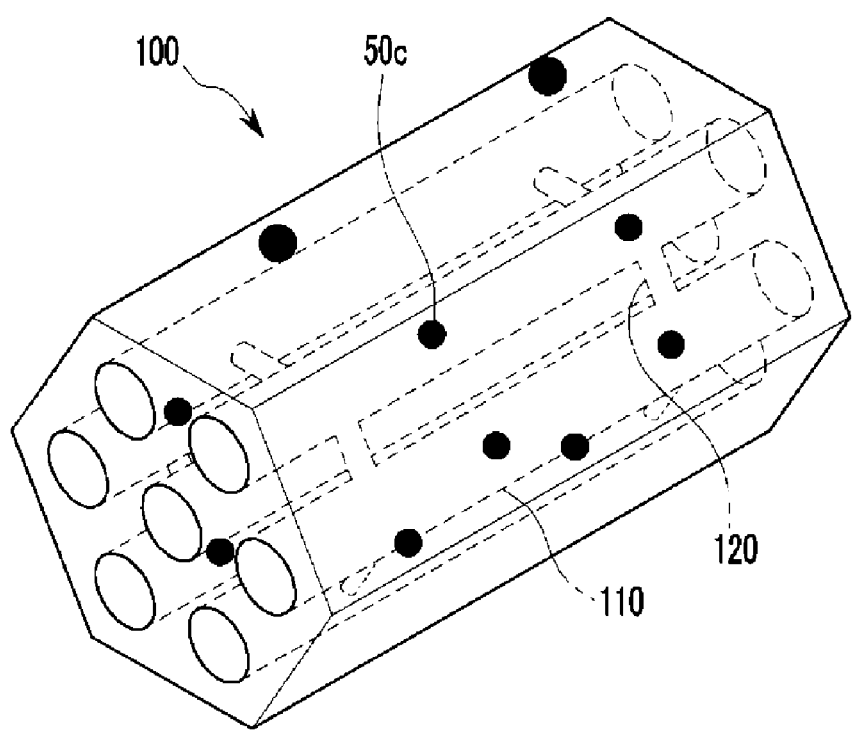
FIG. 4 is a perspective view of exemplary porous structures according to the present invention.

Referring to FIG. 4, various embodiments of the present invention are configured to reduce the wasting of expensive precious metals by minimizing inaccessible regions of the precious metal 15. As such the quantity of the precious metal required for making a catalyst is minimized. For this, a porous structure 100 is used so that the dead zone, that is, the inaccessible region of the precious metal 15, can be minimized by improving the diffusion of the exhaust gas. In various embodiments of the present invention, porous structures 100 have a plurality of channels and are used as a supporting material of the precious metal. The porous structures 100 are made of mesoporous nanoparticles such as MCM or SBA type materials.

The most common types of mesoporous nanoparticles are MCM-41 and SBA-15. MCM-41 among the MCM series is made by using a micro-colloidal crystal template method and synthesizing well-ordered macroporous silica. SBA-15 among the SBA series is made by synthesizing polymer-globular particles using an emulsion polymerization method as an example. Currently, the synthesized polymer-globular particles are arranged regularly by self-assembling and are blended with a mixture, which is a mother liquid, of a hydrochloric acid solution and a triblock copolymer, and then templates of uniform porous globular particles can be obtained and finally the templates are dried and calcinated. The SBA-15 used in various embodiments of the present invention has a mesoporous structure made of silica, and it has pores of 5 to 50 nm that are hydrothermally stable by using an amphiphilic block hollow polymer. For a detailed description of the manufacturing method thereof, one can consult pertinent publications.

For the purpose of reference, micro, macro, and meso in this specification are defined according to IUPAC definition (International Union of Pure and Applied Chemistry) as below 2 nm, over 50 nm, and 2 nm to 50 nm in pore size respectively. In various embodiments of the present invention, mesoporous silica and mesoporous alumina may be used.

Hereinafter, the porous structures 100 will be described in greater detail.

The porous structures 100, as shown in FIG. 4, have a plurality of channels 110 and the channels 110 are connected with each other by bridges 120. The channels 110 have entrances through which the exhaust gas can pass. and the bridges 120 are constructed in such a way that small precious metal powders can rarely move through.

If the catalyst using the above structures 100 as a supporting material is mounted on a vehicle, the particles of the precious metal are agglomerated and sintered, so that the required reaction surface is reduced and the decrease of activity can be prevented. In addition, even when an entrance of a channel 110 is blocked in sintering a supporting material poisoned or contaminated with sulfur, gaseous reactants can still pass through other entrances of the channel 110 and remain active by preventing the entrance of the pores from being blocked and by preventing the precious metal from becoming an inaccessible state. Furthermore, the precious metals are uniformly dispersed as represented by 50c in FIG. 4. As such, the reaction surface is increased and the activity of the catalyst is enhanced.

In other words, a plurality of channels 110 in various embodiments of the present invention are connected with each other, the gaseous reactants can pass through the entrances of the channels 110, and the diffusion of exhaust gas can be improved thereby. In addition, the usage of the precious metal can be minimized to an optimal quantity.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. A catalyst for purifying exhaust gas in a vehicle, the catalyst comprising:
   a precious metal; and
   porous structures that serve as a supporting material for the precious metal;
   wherein the porous structures comprises:
   a plurality of channels; and
   a plurality of bridges that connect the channels with each other.

2. The catalyst of claim 1, wherein the channels have multiple entrances through which reactants can pass thereof.

3. The catalyst of claim 2, wherein the channels have an entrance on each end of the channels.

4. The catalyst of claim 1, wherein the porous structures are made of mesoporous nanoparticles.

5. The catalyst of claim 4, wherein the mesoporous nanoparticles are selected from the group of MCM and SBA materials.

6. The catalyst of claim 5, wherein the MCM are mesoporous silica or mesoporous alumina.

7. The catalyst of claim 5, wherein the SBA materials are mesoporous silica or mesoporous alumina.

* * * * *